(12) United States Patent
Popp et al.

(10) Patent No.: US 12,717,302 B2
(45) Date of Patent: Aug. 25, 2026

(54) METHOD AND SYSTEMS FOR DETERMINING COMPENSATION PARAMETERS

(71) Applicant: Siemens Aktiengesellschaft, Munich (DE)

(72) Inventors: Johannes Popp, Erlangen (DE); Elmar Schäfers, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 341 days.

(21) Appl. No.: 18/285,071

(22) PCT Filed: Mar. 23, 2022

(86) PCT No.: PCT/EP2022/057646
§ 371 (c)(1),
(2) Date: Sep. 29, 2023

(87) PCT Pub. No.: WO2022/207431
PCT Pub. Date: Oct. 6, 2022

(65) Prior Publication Data

US 2024/0176323 A1 May 30, 2024

(30) Foreign Application Priority Data

Mar. 30, 2021 (EP) .................................... 21165783

(51) Int. Cl.
*G05B 19/404* (2006.01)

(52) U.S. Cl.
CPC .. *G05B 19/404* (2013.01); *G05B 2219/36349* (2013.01)

(58) Field of Classification Search
CPC ........ G05B 19/404; G05B 2219/36349; G05B 23/0294; G05B 2219/41154;
(Continued)

(56) References Cited

U.S. PATENT DOCUMENTS 5,374,884 A 12/1994 Koren et al.
6,456,897 B1 9/2002 Papiernik et al.
(Continued)

FOREIGN PATENT DOCUMENTS

CN 104965413 A 10/2015
DE 198 41 718 A1 3/2000
(Continued)

OTHER PUBLICATIONS

PCT International Search Report and Written Opinion of International Searching Authority mailed Jul. 19, 2022 corresponding to PCT International Application No. PCT/EP2022/057646 filed Mar. 23, 2022.

*Primary Examiner* — Chad G Erdman
(74) *Attorney, Agent, or Firm* — Henry M. Feiereisen LLC

(57) ABSTRACT

Compensation parameters are determined and define a compensation signal intended to compensate for a disturbance that occurs during operation of a control target. The control target is controlled during operation by a servo drive control device designed to generate the compensation signal based on the compensation parameters when the disturbance occurs in order to reduce a subsequent fault that can be attributed to the disturbance. A first test parameter set is provided. The servo drive control device performs an operating process in which the disturbance occurs. The servo drive control device generates a first test compensation signal based on the first test parameter set when performing the operating process and receives a first measurement signal as feedback. A first error signal is determined from the first measurement signal. The compensation parameters are determined by a substitution model that maps error signals to compensation signals and uses the first error signal.

27 Claims, 6 Drawing Sheets

(58) Field of Classification Search
CPC ........... G05B 2219/41161; G05B 2219/41163; G05B 2219/49181
See application file for complete search history.

(56) References Cited

U.S. PATENT DOCUMENTS

| | | | | |
|---|---|---|---|---|
| 6,865,499 | B2 * | 3/2005 | Yutkowitz | G05B 19/404 318/632 |
| 8,865,499 | B2 | 10/2014 | Yutkowitz | |
| 2002/0156541 | A1 | 10/2002 | Yutkowitz | |
| 2018/0133860 | A1 * | 5/2018 | Fujita | G05B 19/404 |
| 2019/0317472 | A1 | 10/2019 | Zhi et al. | |

FOREIGN PATENT DOCUMENTS

| | | | |
|---|---|---|---|
| DE | 102010042625 | A1 | 4/2012 |
| DE | 102019002644 | A1 | 10/2019 |
| WO | WO 2007035559 | A2 | 3/2007 |

* cited by examiner

SRE
Servo Drive Control Device
NC Controller
NCS
DV
Torque Precontrol
WZM
Machine Tool
MOT
Motor
SAA
Servo Shaft Drive Unit
P, P1, P2,
$P_1^*$, $P_2^*$
K, K1, K2, $K_1^*$, $K_2^*$
vK(t)
DZR
Rotational Speed Controller
M*(t)
x(t), $L_x(t)$
n(t), $L_n(t)$
Compensation Parameter Sets
Friction Compensation Module
Speed Precontrol
v*(t)
Position Controller
LR
RKM
GV
x*(t)

Machine Tool
WZM
A
S
MD
RE
Component
CP
P, P*
Servo Drive Control Device
SRE
SW
Arithmetic Unit
MS1, MS2, MS3 ex [µm]
6
5
4
3
2
1
0
-1
-2
-3
0
50
100
150
t [ms]
eX0
eX1
eX2
eXS

METHOD AND SYSTEMS FOR DETERMINING COMPENSATION PARAMETERS

CROSS-REFERENCES TO RELATED APPLICATIONS

This application is the U.S. National Stage of International Application No. PCT/EP2022/057646, filed Mar. 23, 2022, which designated the United States and has been published as International Publication No. WO 2022/207431 A1 and which claims the priority of European Patent Application, Serial No. 21165783.8, filed Mar. 30, 2021, pursuant to 35 U.S.C. 119(a)-(d).

BACKGROUND OF THE INVENTION

The invention relates to a method for determining compensation parameters, wherein the compensation parameters define a compensation signal (dependent on multiple compensation parameters), wherein the compensation signal is intended to compensate for at least one disturbance, wherein the at least one disturbance occurs preferably deterministically during operation of a control target because of a friction effect, wherein the control target, which for example comprises a shaft of a machine tool, is controlled during operation by a servo drive control device, wherein the friction effect occurs during operation at at least one reversal point of a servo-driven shaft of the control target, wherein the servo drive control device is designed, on occurrence of the at least one disturbance, to generate the compensation signal on the basis of the (multiple) compensation parameters, in order to reduce a subsequent error that can be attributed to the disturbance.

The invention additionally relates to a method for monitoring a control target.

The invention further relates to a system for executing the aforementioned methods.

The invention also relates to a computer program containing the commands that cause the aforementioned system to execute one or both of the aforementioned methods.

As well, the invention relates to a computer-readable medium on which the aforementioned computer program is stored.

Methods and systems in which compensation is triggered in the event of a deviation between setpoint and actual values are sufficiently well-known. If such a deviation occurs, the servo drive control device typically generates a compensation signal, which is injected into a setpoint signal in order to compensate for the error.

In connection with the present invention the term disturbance means a disturbance that can be attributed to a physical effect preferably inside the control target. In other words, it relates here to the control-target-internal disturbances with a physical origin.

For example, the positional accuracy of machine feed shafts (in particular machine tools, and processing and production machines) is impaired by friction, for example at the drive train or in the guides of the moving components. Primarily at position reversal points, comparatively large deviations occur between setpoint position and actual position. This represents a key problem, especially for machines in tool mold construction, for example for plastic injection molding tools—or aluminum die-cast tools. For this reason the setpoint generation of NC controllers for the machine shafts involved in the machining process contains a mechanism to compensate for the friction effects occurring at the reversal points. This mechanism can be triggered by the speed zero crossing of the setpoint or actual signal and results in the injection of an additional compensation signal into the rotational speed setpoint value.

The positioning quality achievable with the compensation curve defined by the compensation parameters depends significantly on the appropriate selection of the parameters. The parameters to be selected for an optimum compensation quality depend in this case on machines and shafts and normally differ at reversal points with positive and negative acceleration ("upper" and "lower" reversal point). Moreover, the optimum selection of the parameters normally depends on the acceleration level during the reversal of direction.

The dependency on the acceleration level can be implemented here by a linear interpolation between freely selectable acceleration-related interpolation points for the (compensation) parameters.

It is thus clear that for a single shaft a plurality of parameters has to be ascertained for different acceleration levels at both the reversal points. In the case of a machine with five drive shafts and the selection of six value pairs for the acceleration-dependent interpolation a total of 60 parameter sets has to be ascertained, for example, which when using existing parameterization methods means that commissioning takes a long time, this not being acceptable for customers.

In addition, the currently implemented methods for compensation of friction initially require that the friction is constant across the lifetime of the machine. If the friction changes—for example by shrinkage of guide rails—a manual intervention is necessary.

Known from the prior art for example are methods for the manual parameterization by observation of the subsequent error at a circular test (see DE 198 41 716 A1) and a heuristic trial-and-error procedure. In this approach an experienced commissioning engineer is necessary, who by observation of the subsequent error between setpoint and actual position, for example during the sinusoidal movement of an individual shaft (circular test), makes an iterative adjustment of the parameters. In practice a qualitative connection is known between the individual parameters of the parameter set and the resulting subsequent error, on the basis of which a heuristic trial-and-error procedure has been established.

The following significant disadvantages of this approach may be mentioned:

Experienced commissioning engineer necessary

Long time taken for commissioning.

If this type of method is automated, the problem of the long time taken for commissioning remains.

Known from U.S. Pat. No. 6,865,499 B2 is a method and a machine for tuning compensation parameters in a motion control system associated with a mechanical member. The method includes the following steps. Receiving an indication of a compensation parameter to be tested; based on the compensation parameter to be tested causing a signal to command a desired motion of the mechanical component; acquiring control data associated with the signal; acquiring measurement data associated with the actual motion of the mechanical member in response to the signal; analyzing the control and measurement data; and based on the step of analyzing the control and measurement data, implementing a value of the compensation parameter.

The objective technical object of the present invention can thus be seen as providing methods and systems for the faster and more efficient determination of compensation parameters to compensate for disturbances caused by friction occurring during operation at at least one reversal point of a servo-driven shaft of a control target—friction compensation parameters—which enable an automatic and fast determination of the friction compensation parameters and thereby simplify commissioning and reduce the time needed for commissioning. In addition, account can thereby be taken of different acceleration levels at the different reversal points.

SUMMARY OF THE INVENTION

The object is inventively achieved with the method mentioned in the introduction, in that a first test parameter set is provided; the servo drive control device is caused to perform an operating process in which the at least one disturbance occurs, wherein the servo drive control device generates a first test compensation signal (dependent on multiple parameters) during the performance of the operating process based on the first test parameter set and receives a first measurement signal as feedback (from the control target); a first error signal is determined from the first measurement signal; the compensation parameters are determined by means of a substitution model, wherein the substitution model maps error signals to compensation signals, and using the first error signal.

Because a first test parameter set (preferably consisting of two or more parameters) is provided and the compensation parameters are determined at the end, it follows that it is possible to determine multiple compensation parameters simultaneously. As a result it is possible to use significantly more complex compensation signals, which for example take into account a dead time and/or a dwell time, i.e. in which these variables can be taken into account by adding corresponding parameters.

In one form of embodiment it can be provided that when determining the first error signal, use can be made of setpoint values, wherein the setpoint values are defined by the operating process.

In one form of embodiment it can be provided that the compensation parameters are ascertained/determined on the basis of a first error signal—of a substitute compensation signal—mapped by the substitution model to a compensation signal. In this case a difference between a compensation curve and the substitute compensation signal can for example be minimized, wherein the compensation curve is used as a minimization variable. This means the compensation curve is varied in order to achieve the minimum. In other words, the difference formed between a random or variable compensation signal (the compensation curve) and the substitute compensation signal is minimized by varying the parameters establishing/defining the random compensation signal. The determination of the compensation parameters is in this case very simple and very fast.

The substitution model for example models the behavior of the servo drive control device and of the control target. For example, the substitution model can be designed as a model of a self-contained control loop, for example of a position control loop.

In one form of embodiment it can be provided that the first test parameter set consists of compensation parameters that are all equal to zero (first test run: without compensation).

In one form of embodiment it can be provided that a second test parameter set (consisting of multiple parameters) is further provided; the servo drive control device is caused to repeat the operating process, wherein the servo drive control device generates a second test compensation signal during the repetition of the operating process based on the second test parameter set, wherein the second test compensation signal differs from the test compensation signal, and receives a second measurement signal as feedback; a second error signal is determined from the second measurement signal; on the basis of the test compensation signals and the measurement signals a transmission behavior model is determined or generated or created, wherein the transmission behavior model simulates a transmission behavior between compensation signals (input) and error signals (output), i.e. maps compensation signals (input of the transmission behavior model) to error signals (output); the compensation parameters are determined on the basis of the transmission behavior model.

Since the transmission behavior model can describe the general connection between an input signal and an output signal, it is a dynamic system or model, which enables an advanced calculation of an output in consequence of an input.

In one form of embodiment it can be provided that when determining compensation parameters on the basis of the transmission behavior model an optimization takes place, in particular a minimization of a quality value related to a specified error signal and to an error signal simulated by means of the transmission behavior model. In addition it may be expedient if the optimization, preferably the minimization, takes place by varying parameters, said parameters defining a (compensation) signal, said signal being used as input for the transmission behavior model, in order to generate the simulated signal (simulated error signal).

The aim of the optimization is to make the simulated (error) signal coincide with the specified error signal. The specified error signal is preferably not changed during the optimization.

In one form of embodiment it can be provided that the specified error signal is the first error signal.

In one form of embodiment it can be provided that the specified error signal is the second error signal.

In one form of embodiment it can be provided that a p-norm, where $p \in \mathbb{R}$, $p \geq 1$, is used as a quality value.

In one form of embodiment it can be provided that the second test parameter set includes the compensation parameters ascertained on the basis of the substitution model, preferably consists of the compensation parameters ascertained on the basis of the substitution model, so that the second test compensation signal is equal to a compensation signal based on the compensation parameter ascertained on the basis of the substitution model.

In one form of embodiment it may be expedient if the servo drive control device is caused to perform the operating process a further time, wherein the servo drive control device generates the compensation signal based on the (multiple) compensation parameters determined on the basis of the transmission behavior model and receives a third measurement signal as feedback, wherein based on the third measurement signal a third subsequent error is determined, wherein the first, the second and the third error signals are compared in order to select those compensation parameters that result in the most minor error signal.

In one form of embodiment it can be provided that the error signal is a location error signal or a position error signal or a speed error signal.

In one form of embodiment it can be provided that the control target is designed as a machine tool, a processing machine or a production machine.

In one form of embodiment it can be provided that the disturbance is caused by a friction effect, wherein during operation the friction effect occurs at at least one reversal point of a servo-driven/servo-drivable shaft of the control target.

The control target can additionally comprise a motor (for example a servo-drive) which drives the shaft.

In one form of embodiment it can be provided that the compensation parameters are determined as a function of the shaft position of the control target.

In one form of embodiment it can be provided that the shaft is a feed or rotary shaft. Further types of shafts are conceivable: rotary shafts with transmission, rotary shafts with torque motor, translatory feed shafts with linear motor, translatory feed shafts with ball screw drive and one or more rotary motors, translatory feed shafts with pinion/gear rack translation and one or more rotary motors.

In one form of embodiment it can be provided that the at least one reversal point is a position reversal point.

In one form of embodiment it can be provided that the servo drive control device comprises an NC control unit and a servo drive unit.

The object is also inventively achieved with a method in which during the method a control target is monitored, wherein the control target is controlled during operation by a servo drive control device, wherein the servo drive control device is designed to generate a compensation signal on the basis of compensation parameters on occurrence of a disturbance in the control target, in order to compensate for the disturbance, wherein during the monitoring the aforementioned method is executed to determine compensation parameters on an event-triggered basis and/or at periodic intervals in time, in order to determine optimized compensation parameters, the optimized compensation parameters are compared with the compensation parameters, a warning is output if a deviation, exceeding a predefined value, exists between the compensation parameters and the optimized compensation parameters.

This method can be used in order for example to achieve a regular adaptation to changing friction conditions.

In one form of embodiment it can be provided that the method is a wear-out analysis method, a maintenance procedure, preferably a status-oriented maintenance procedure or a condition monitoring method.

In one form of embodiment it can be provided that if a deviation exceeding a predefined value exists between the compensation parameters and the optimized compensation parameters the optimized compensation parameters are for example accepted by the servo drive control device, for example in order to execute compensation on the basis of the optimized compensation parameters.

In one form of embodiment it can be provided that the execution of the method to determine the combination parameters is triggered if a defined quality criterion is no longer satisfied, for example when a predetermined value is exceeded by a setpoint/actual value deviation at reversal points in reference runs (for example a circular test) or during regular machine operation.

In one form of embodiment it can be provided that a message is output if the optimized parameters are accepted.

The object is also inventively achieved with a system, in that the system comprises a servo drive control device, a control target and an arithmetic unit, wherein the control target is controlled during operation by the servo drive control device, wherein during operation of the control target at least one disturbance occurs (in the control target), wherein the servo drive control device is designed, on occurrence of the at least one disturbance, to generate a compensation signal in order to compensate for the at least one disturbance, wherein the compensation signal is defined by compensation parameters, wherein the arithmetic unit is configured in order to execute the aforementioned method for determining the compensation parameters or the aforementioned method for monitoring the control target.

In one form of embodiment it can be provided that the arithmetic unit comprises a machine-readable, for example volatile or nonvolatile, memory, on which machine-executable components can be stored, and a processor operatively coupled to the machine-readable memory, which is configured to execute the machine-executable components.

In one form of embodiment it can be provided that the servo drive control device includes the arithmetic unit.

The aforementioned methods and systems result in significantly less expenditure of time when ascertaining the compensation parameters. One reason for the time saving is that the compensation parameters are generated on the basis of mathematical system models and fewer real measurements are necessary for this.

One reason for the time saving is that the compensation parameters are determined on the basis of mathematical system models instead of real measurements.

In the aforementioned methods the parameter set can be iterated until a satisfactory error curve is produced. In methods in accordance with the prior art, a real measurement must be performed for this, with the duration of a sine period for each parameter set. Especially in the case of setpoint signals with a high period duration this takes a very long time. With a period duration of 30 seconds the measurement accordingly lasts at least 30 seconds. The number of parameter sets increases rapidly with the number of shafts. As described above, 60 parameter sets is not a large number in this case.

In the aforementioned method the real measurement is replaced by the simulation. This takes place virtually, for example on a microcontroller, and is concluded in a few milliseconds.

BRIEF DESCRIPTION OF THE DRAWING

The invention is described and explained in greater detail below on the basis of the exemplary embodiments shown in the figures, in which.

DETAILED DESCRIPTION OF PREFERRED EMBODIMENTS

Figure 1:
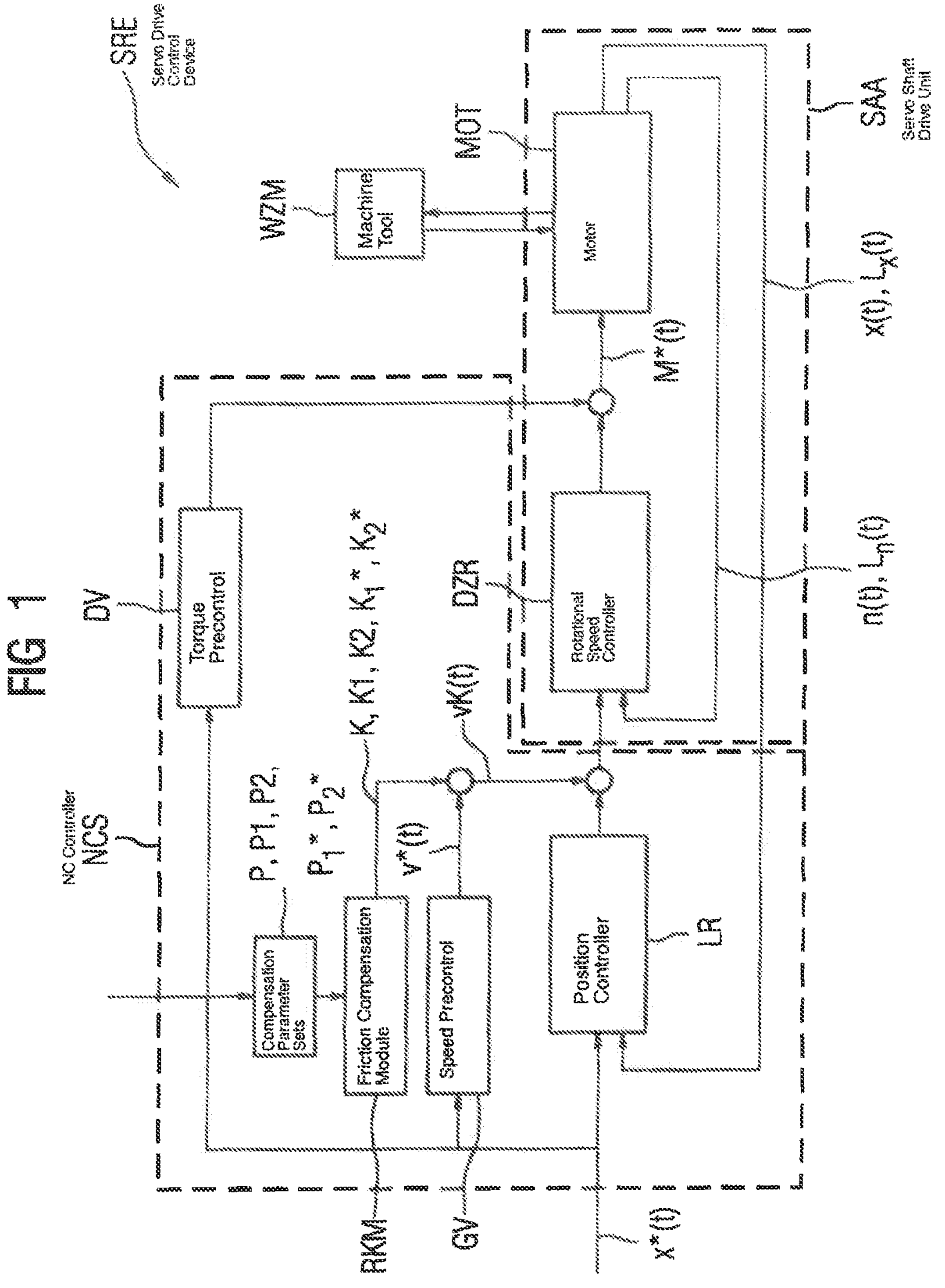
FIG. 1 shows a control structure of a machine shaft.

In the exemplary embodiments and figures the same elements can in each case be provided with the same reference characters. In the case of the time-dependent signals the time curves may of course be different, although the signals are provided with the same reference characters. The reference characters also serve in the claims and in the description merely to improve understanding of the present application and should on no account be regarded as a restriction of the subject matter of the present invention.

FIG. 1 shows an exemplary control structure of a machine shaft, for example a linear shaft, in particular a position-controlled feed shaft of a machine tool WZM. FIG. 1 shows an NC controller NCS and a servo shaft drive unit SAA, which together form a servo drive control device SRE, which can correspond to an inventive servo drive control device.

The shaft of the machine tool WZM is thus controlled during operation by the servo drive control device SRE.

The NC controller NCS can for example comprise a position controller LR, a speed precontrol GV, a friction compensation module RKM and a torque precontrol DV. A setpoint position signal x*(t), which for example causes a passage through both reversal points of the feed shaft (the variable t designates the time as a free variable), can be supplied to the position controller LR, the speed precontrol GV and the torque precontrol DV.

Use can be made for example of a sinusoidal position setpoint signal $x^*(t)=Samp\cdot\sin(2\pi\cdot t/STperi)$, wherein for example $Txset=1.25\cdot STperi$. In this case the variable Samp is the amplitude and STperi is the period duration of the sine movement.

Different compensation parameters, for example in the form of compensation parameter sets P, P1, P2, P1*, P2*, can be supplied to the friction compensation module RKM, and define different compensation signals K, K1, K2, K1*, K2*.

The friction compensation module RKM is provided in order to generate compensation signals K, K1, K2, K1*, K2* that are used for compensation of the disturbances occurring because of friction effects—friction compensation for short. It is clear that the compensation signals K, K1, K2, K1*, K2* are generally time-dependent, in other words are a function of time f(t).

Figures 2, 3:
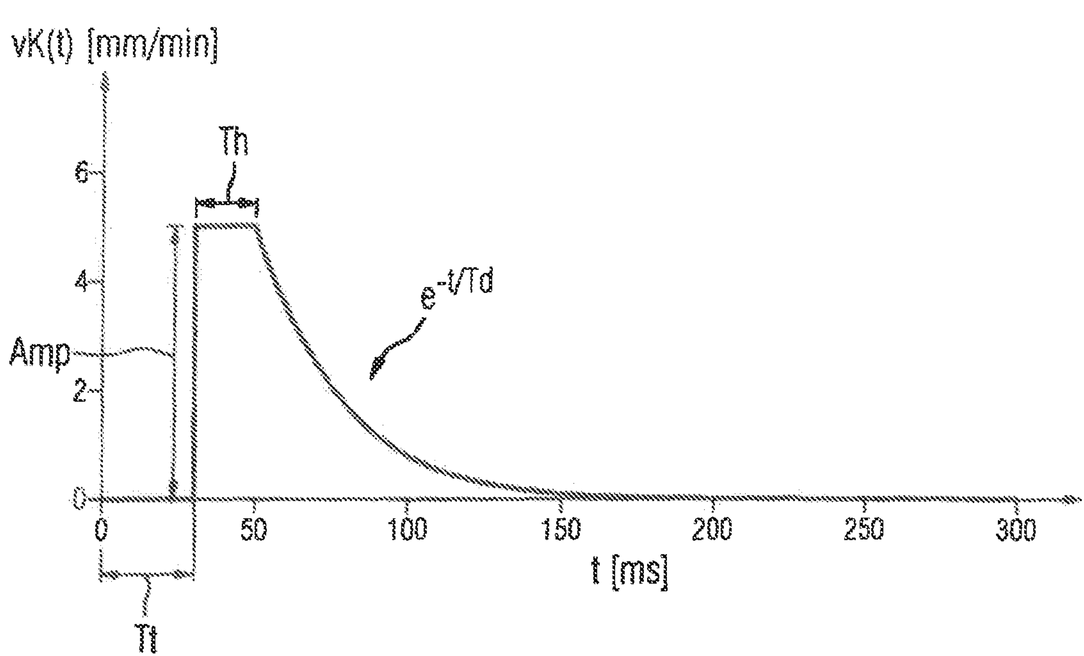
FIG. 2 shows an example of a compensation curve for a linear shaft.
FIG. 3 shows a system architecture with an arithmetic unit assigned to the servo drive control device for ascertaining compensation parameters.

At this point reference may be made to FIG. 2, which illustrates an example of a compensation signal K, which in the event of disturbances can be applied at a shaft, for example at a position-controlled, in particular translatory feed shaft of the machine tool WZM. The shaft can for example be a linear shaft which is servo-driven (during operation of the machine tool WZM). The disturbance can for example be caused by friction effects which occur, preferably deterministically, at the reversal points of the shaft, in other words whenever the speed changes its sign. The compensation signal K(t) shown in FIG. 2 can therefore be a compensation signal which is provided to compensate for the errors occurring because of the friction effects (for example position errors and/or rotational speed errors and/or speed errors at the axis reversal points). The compensation signal K depends in this example on a total of four parameters: delay time Tt, dwell time Th, decay time Td, and maximum value of the compensation Amp.

For example, the compensation signal can be generated such that t=0 corresponds to one of the reversal points as regards the setpoint values thereof (i.e. v*(t)). In this case v*(t) is observed and the timepoint at which v*(t) changes the sign from plus to minus is the zero timepoint for the compensation curve. When switching from minus to plus the speed compensation curve K(t) can be injected so that K has a positive sign. When v*(t) is switched from plus to minus K can have a negative sign.

The speed precontrol GV can generate a setpoint speed signal v*(t), into which the compensation signal K, K1, K2, K1* or K2* can be injected or added, as a result of which a signal vK(t) is generated.

The signal vK(t)—the setpoint speed signal v*(t) with the compensation signal K1, K2, K1* or K2* injected into it—can be added to a signal generated by the position controller LR and supplied to a rotational speed controller DZR, which is contained in the servo shaft drive unit SAA.

In other words, the compensation signal K(t), the position controller output and the output of the speed precontrol GV or the speed setpoint signal v*(t) together form the rotational speed controller input.

The rotational speed controller DZR can generate a signal which after an addition to a signal generated by the torque precontrol DV can be supplied to a motor (motor with load) MOT as a setpoint motor torque signal M*(t). The motor with load MOT represents the system to be controlled—in other words a machine shaft—and is an example of the inventive control target. The motor can be contained in the servo shaft drive unit SAA. The motor MOT can also be designed as part of the machine tool WZM, whose shaft can be controlled by the servo drive control device SRE (by the NC controller NCS and the servo shaft drive unit SAA) and is controlled during operation.

When a disturbance occurs in the machine tool WZM, which for example, as already mentioned, can be caused by friction (friction effect), the compensation signal K, K1, K2, K1* or K2* can for example be generated based on one of the aforementioned compensation parameter sets P, P1, P2, P1*, P2*.

The friction effects, in particular static friction effects, can in particular occur at the reversal points. Hence it may be expedient if the compensation is triggered in consequence of an ascertained occurrence for example of a zero crossing of the speed precontrol signal, this corresponding to the passage through a reversal point (for example at t=0 in FIG. 2).

The detection of a reversal point can take place by detection of a zero crossing of a speed signal. The speed actual signal v(t) or the output of the position controller LR or the output of the speed precontrol v*(t) in FIG. 1 can for example be used as a speed signal.

Accordingly the compensation signal K(t) for the duration Tt can be equal to zero ($t0\leq t<Tt$, $|K(t)|=0$).

The amplitude of the compensation signal can then be increased, preferably abruptly, to a particular value and kept at this level for a particular time $Tt\leq t<Tt+Th$ ($|K(t)|=Amp$). An exponential decay where $|K(t)|=Amp\cdot\exp((Tt+Th-t)/Td)$ can then follow.

The sign of K(t) can be aligned to the type of the reversal point. The following designations for the reversal points come into consideration:

Change from a positive to a negative shaft speed: reversal point 1 or UP1 or upper reversal point; and change from a negative to a positive shaft speed: reversal point 2 or UP2 or lower reversal point. The time windows following on from the reversal points with the duration of a half period STperil2 of the sinusoidal setpoint curve are designated by T_UP1 and T_UP2. It may be advantageous if the sign of K(t) is positive if the speed changes its sign from negative to positive, and negative if the speed changes its sign from positive to negative.

To take account of different acceleration at different reversal points, the parameters Amp, Tt, Th, Td can be specified separately for both the reversal points.

The compensation curve shown in FIG. 2 or the compensation signal shown can be defined by four freely selectable parameters P={Amp, Tt, Th, Td} per reversal point UP1, UP2.

Other forms of compensation signals are also conceivable for compensation, for example for friction compensation in the case of a machine shaft, for example a linear shaft, in particular a position-controlled feed shaft of the machine tool WZM. For example, a pulse function can be used. The compensation can have a PT1- or PT2-shaped rise in the compensation signal instead of the abrupt rise shown above. The compensation function can also be defined sectionally from n-th degree polynomials.

In addition, the motor MOT can generate feedback signals for the position controller LR and the rotational speed controller DZR. The feedback signal for the position controller LR can comprise an actual motor position x(t) (first encoder system) and an actual load position Lx(t) (second encoder system). The feedback signal for the rotational speed controller DZR can comprise an actual motor rotational speed n(t) and an actual load rotational speed Ln(t).

FIG. 3 shows a system architecture with an arithmetic unit RE assigned to the servo drive control device SRE for ascertaining the compensation parameters.

The arithmetic unit RE for example comprises at least one machine-readable, for example volatile or nonvolatile, memory, on which machine-executable components can be stored, and at least one processor which is operatively coupled to the machine-readable memory and configured to execute the machine-executable components.

In summary, the arithmetic unit RE or the memory of the arithmetic unit RE comprises a component CP containing commands, which on execution of the component CP by the processor of the arithmetic unit RE (or by another processor), causes the servo drive control device SRE to perform an operating process/an operating scenario, in which the disturbance to be compensated for occurs because of friction effects.

The arithmetic unit RE can, but need not, be part of the servo drive control device SRE. The resources needed for storing and executing the component CP can be provided by the servo drive control device SRE. However, they can also be provided by a unit structurally separate from the servo drive control device SRE, for example by a PC.

FIG. 3 makes clear that the arithmetic unit RE can be designed as a unit structurally separate from the servo drive control device SRE, and illustrates the manner in which the arithmetic unit RE or the machine-executable component CP, for example a software module which is stored on the machine-readable memory of the arithmetic unit RE, interacts with the servo drive control device SRE if it (the component CP) is executed by the processor of the arithmetic unit RE.

The component CP can for example be designed as a part (for example as a module) of the software, for example HMI software, commissioning or engineering software. This software can be executed either on an (external) PC, an IPC integrated into the system or directly on the NCU of the NC controller. The component CP can further be executed and preferably stored on the NC controller NCS or on a PLC controller.

The component CP can be designed as an application of an industrial computer, for example of an Edge computer, or as a cloud application.

The component CP can for example be based on programming in Matlab or similar, which can be converted by a corresponding interpreter into the C++ language (known as code generation).

A parameter set P, P1, P2, P1* or P2* from the compensation parameters, and control values SW for the servo drive control device SRE serve as output values of the component CP.

The component CP thus initiates a performance of an operational or measurement scenario, in that it supplies the servo drive control device SRE with a parameter set P, P1, P2, P1* or P2* and the control values SW.

The control values SW can for example comprise setpoint values, for example setpoint position values for the setpoint position signal $x^*(t)$. In addition, the component CP can transmit a Boolean signal to the NC controller NCS for the activation and/or deactivation of the measurement scenario.

It is clear that the servo drive control device SRE executes a corresponding parts program if it performs the operating process/the operating scenario/the measurement scenario.

In addition, the component CP can contain characteristic quantities S as input values, with which for example a setpoint curve $S^*(t)$ can be defined for example for a defined time interval $0 \leq t < Txset$. The setpoint curve $S^*(t)$ can be used as a reference scenario for the time of the ascertainment of the compensation parameters and represents a scenario for which a compensation for disturbances is aimed at.

For example, the characteristic quantities S in the aforementioned sinusoidal position setpoint signal $x^*(t) = Samp \cdot \sin(2\pi \cdot t/STperi)$ contain the amplitude Samp and the period duration STperi of the sine movement.

It is apparent from FIG. 3 that the servo drive control device SRE likewise receives the (same) characteristic quantities (for example per manual specification).

The sinusoidal setpoint curve $x^*(t)$ results in a back-and-forth movement of the feed shaft and contains two reversal points, wherein in the case of a first reversal point both in respect of the actual variables and also in respect of the setpoint variables a reversal from a positive to a negative speed takes place and in the case of a second reversal point a reversal from a negative to a positive speed takes place.

In addition, the component CP can receive machine data MD which for example is specified by a machine user. The machine data can for example comprise information about the shaft type (rotational or translatory movement of the shaft, etc.), proportional gain Kv of the position controller LR, reset time Tn of the integration element of the rotational speed controller DZR, etc.

Furthermore, the component CP can be supplied with adjustment parameters A, which specify the function of the algorithm/component CP in greater detail. For example, the component CP can have an expert mode, wherein it is only possible to adjust the parameters A in expert mode.

During the performance of the operating scenario the servo drive control device SRE generates a compensation signal K, K1, K2, K1*, K2*. As feedback from the machine tool WZM the servo drive control device SRE receives an actual signal or a measurement signal MS1, MS2, MS3.

These measurement signals MS1, MS2, MS3 can be the aforementioned feedback signals of the motor MOT for the position controller LR and the rotational speed controller DZR—in other words actual position x(t), an actual load position Lx(t), actual rotational speed n(t) and an actual load rotational speed Ln(t).

The servo drive control device SRE can supply the arithmetic unit RE, in particular the component CP, with the measurement signals MS1, MS2, MS3.

Furthermore, the component CP can additionally use one or more of the following signals:

position setpoint curve $x^*(t)$;

compensation signal $K(t)$;

speed setpoint curve $v^*(t)$.

For this, the component CP can in each case either form the signals $x^*(t)$, $K(t)$, $v^*(t)$ itself or obtain them transmitted from the servo drive control device SRE. If the component CP forms the signals itself, it forms the signal $x^*(t)$ preferably sinusoidally and transmits it to servo drive control device SRE.

The signals used in the component can be plotted for example over the aforementioned specified time horizon Txset.

The sampling time of the measurement can for example be geared to the clock pulse of the position controller LR and can for example be 125 μs, 250 μs, 500 μs, 1 ms, 2 ms, 4 ms, 8 ms.

Figure 4:
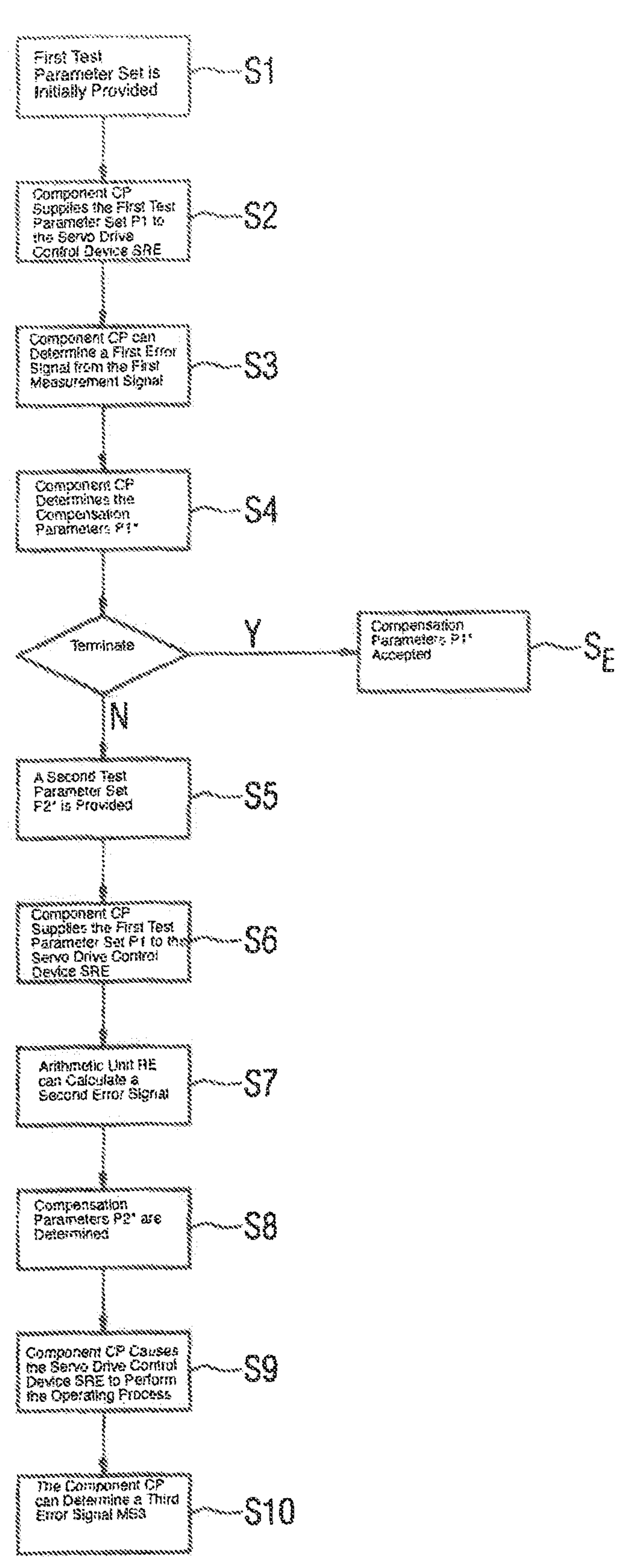
FIG. 4 shows a flow diagram of a method.

FIG. 4 shows a flow diagram which illustrates an operating sequence of an exemplary method for determining the compensation parameters. The method can for example run on the system architecture of FIG. 3.

To determine the compensation parameters P1*, a first test parameter set P1 is initially provided—step S1. This can for example be provided by manual input via a user interface of the component CP. The component CP can also automatically generate the first test parameter set P1 (in accordance with particular specifications).

The first test parameter set P1 can for example comprise compensation parameters that are constant over time and that for example can all be equal to zero (first test run: without compensation).

In step S2 the component CP supplies the first test parameter set P1 to the servo drive control device SRE and causes it to perform the measurement scenario specified for example by the characteristic quantities S and the control values SW (first measurement). If necessary the component CP can also supply the servo drive control device SRE with the setpoint values SW or initiate or stop the performance of the measurement scenario by a simple signal to the servo drive control device SRE, for example as mentioned above, using a Boolean signal.

The servo drive control device SRE, preferably the friction compensation module RKM of the servo drive control device SRE, generates a first test compensation signal K1 from the first test parameter set P1 and performs the operating scenario provided for the measurement, in which the first test parameter set P1 is used. In this case the servo drive control device SRE receives a first measurement signal MS1 as feedback.

It is conceivable for all parameters in the test parameter set P1 to be equal to zero, so that the first test compensation signal K1 is equal to zero, i.e. the operating scenario is performed without compensation.

The servo drive control device SRE can then supply the first measurement signal MS1 to the component CP of the arithmetic unit RE.

The first measurement signal MS1 can for example be a position actual curve $x(t)$, which can for example relate to a random measurement point on the feed shaft and be determined by a rotational or translatory encoder. It is possible for the encoder used for this to be made available only for the time taken to ascertain the parameters. The encoder can for example be mounted on the feed shaft.

In step S3 the component CP can determine a first error signal (a first time curve of the subsequent error) from the first measurement signal. To this end the component CP can for example use setpoint values, said setpoint values being defined by the measurement scenario.

For example, the component can subtract the location/position actual value $x(t)$: $eX(t)=x^*(t-Te)-x(t)$ from the time-shifted location/position setpoint value $x^*(t-Te)$.

An error signal such as this, which is formed as a difference between actual position and time-shifted setpoint position, is particularly advantageous in the evaluation of the friction error. Thanks to the time shift of the setpoint position the shift between setpoint and actual position to be expected even without friction can be taken into account. This shift is to be expected because of delay times of the microcontroller during execution of the regulation and control algorithm.

In this case the variable Te can for example be ascertained, such that in a time interval in which no shaft reversal occurs, a minimum norm, for example 2-norm for $eX(t)$, is produced. As a result it can be achieved that $eX(t)$ only represents the deviations caused by disturbance effects, in particular disturbance effects, for example friction effects, at the reversal points. Deviations due to delays or dead times during the measurement of $x(t)$ and systematic deviations that always occur during travel of the shaft where $x^*(t)\neq 0$ and with an imperfectly adjusted control and regulation structure, are in this way isolated. A linear least-squares method can for example be used for the numeric ascertainment of Te.

In step S4 the component CP determines the compensation parameters P1* on the basis of the first error signal. In this case the component utilizes a preferably dynamic substitution model EM (see FIG. 5), in which the error signal EM forms an output signal. As input signal for the substitution model EM a signal is used which is associated with the compensation signal $K(t)$. The substitution model EM therefore describes a relationship between the compensation signal and the error signal.

When determining the compensation parameters P1* the component CP performs an optimization on the basis of the substitution model EM.

For example, during the optimization a substitute compensation signal, for example v_eX_equiv(t), corresponding to the error signal is formed from the first error signal, for example the $eX(t)$, and the substitution model EM. The optimization has, by adjustment of the compensation parameters, the aim of minimizing the difference between the substitute compensation signal and the compensation signal, wherein the compensation signal or the parameter set defining the compensation signal is used as a variable.

The substitution model EM can for example be stored on the arithmetic unit RE or else on a (remote) memory separate from the arithmetic unit RE, for example in a cloud.

Figure 5:
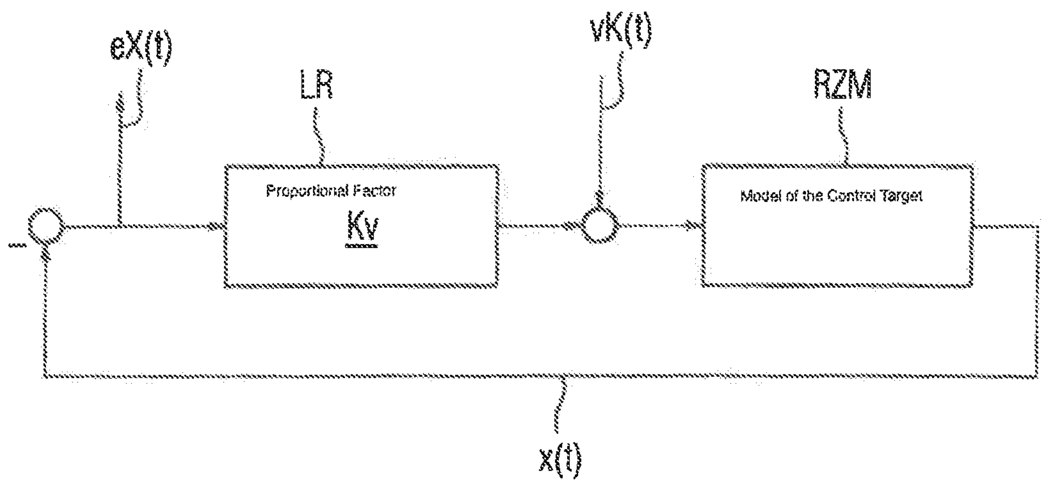
FIG. 5 shows a substitution model of the self-contained position control loop.

FIG. 5 shows a substitution model EM of a self-contained position control loop, which can be used as an inventive substitution model. The substitution model in FIG. 5 comprises a model of a position-controlled NC shaft, which is regarded as a linear dynamic system, in particular as an LTI system (linear time-invariant dynamic system).

The compensation signal $K(t)$ can for example be used as input and optimization variable, wherein the first error signal $eX(t)$ is seen as output.

The substitution model EM in FIG. 5 therefore describes the dynamic input/output behavior, for example between K (t) and $eX(t)$. In this case it may be expedient to assume an ideal speed specification and a (pure) amplification element with a proportional factor Kv as position controller LR—in other words an ideal speed control. The signal $K(t)$ with the output of the position controller LR forms the input for a model RZM of the control target, here—of the motor with load MOT or the machine tool shaft.

The substitution model EM is preferably a PT1 element. In this case the transmission behavior between input and output signal can be described by the following mathematical operator G(s)=1/(Kv+s). The variable s designates the Laplace operator. G(s) is designated as a transmission function and describes the transmission behavior of the controlled shaft as a whole, in other words from the above-described behavior—K(t) as input, eX(t) as output.

For example, based on the mentioned input/output behavior (on the substitution model EM) a conversion of the first error signal eX(t) ascertained in step S3 to the corresponding substitute compensation signal v_eX_equiv(t) can take place, this being used as an input signal. This can be achieved mathematically by inversion of the previously described transmission function.

This can for example take place in the following substeps. Firstly the first error signal eX(t) can be low-pass filtered. Then a derivation over time of the low-pass filtered first error signal can for example be formed by numeric differentiation. After this the first error signal eX(t) can be multiplied by the factor of the proportional gain Kv. Lastly the derivation of the low-pass filtered first error signal and the first error signal multiplied by the factor of the proportional gain Kv are added together.

On the basis of the substitute compensation signal v_eX_equv(t) corresponding to the first error signal eX(t) the parameter sets P1*_UP1, P1*_UP2 can be determined as follows for the respective reversal point. Both the reversal points UP1 and UP2 can in this case be considered separately in the time intervals T_UP1 and T_UP2. The absolute maximum of the inverted first error signal, in other words of the substitute compensation signal v_eX_equiv(t), can serve as Amp. The delay time can be set as equal to zero Tt=0. The dwell time Th and the decay time Td can be defined as Th=k·Tsum, Td=(1−k)·Tsum where 0<k<1, wherein the parameter k can be defined/set by the adjustment parameters or algorithm parameters A. In this case the parameter Tsum can be ascertained by forming a surface integral from the substitute compensation signal v_eX_equiv(t) and dividing the surface integral by Amp. The parameters (Amp, Tt, Td, Th) can then be varied, such that a particular quality value J is minimized. For example, a 1-norm of the first error signal eX(t) can be minimized. The parameters for which a minimum is achieved can be used as compensation parameters P1*.

A normal value related to the simulated subsequent error (to the simulated subsequent error signal) can for example be used as quality value J. For example, a norm of the subsequent error signal, for example of a position error and/or rotational speed error and/or speed subsequent error can be used in an interval after a reversal point.

Depending on the type of measurement signals available (position and/or rotational speed and/or speed), corresponding (first, second or even—see below—third) error signals can be formed and calculated using relevant setpoint signals as differences.

It is clear that what has been said above applies for both reversal points UP_1 and UP_2. In other words, the quality values J can be determined from a sectional consideration of the error signal eX(t). For example, two quality values J_UP1 and J_UP2 related to both the reversal points with the time intervals T_UP1 and T_UP2 can be used. The parameters Amp_UP1, Tt_UP1, Th_UP1, Td_UP1 or Amp_UP2, Tt_UP2, Th_UP2, Td_UP2 should in this case be ascertained so that J_UP1 or J_UP2 becomes minimal.

A norm, in particular absolute maximum, Euclidian norm, 4-norm, etc., can for example serve as a quality value J.

A fixed value or for example the time duration between two reversal points or a fraction of this time duration can for example be used as a time window.

Alternatively the compensation parameters P1* can be determined in that at the respective reversal point Amp is defined as the absolute maximum of Kv·eX(a); the delay time and the dwell time Th are set as equal to zero Tt=Th=0; and the decay time Td as the time duration between timepoints T_eX_max and T_eX_30, wherein T_eX_max is a timepoint at which Kv·eX(f)=Amp, and T_eX_30 is a timepoint as from which Kv·eX(t) moves in an interval 0.3·Amp.

If the compensation parameters P1* already result in very good compensation results, the determination can be terminated and the compensation parameters P1* accepted and for example stored in the arithmetic unit RE and/or in the servo drive control device SRE—step $S_E$.

To determine compensation parameters P2* that produce even better results, a second test parameter set P2 can be provided in step S5. The second test parameter set P2 can for example be provided by manual input via a user interface of the component CP. The component CP can also automatically generate the second test parameter set P2 (in accordance with particular specifications).

The second test parameter set P2 differs from the first test parameter set P1, so that test compensation signals generated therefrom differ. The second test parameter set P2 preferably consists of the compensation parameters P1* determined in steps S1 to S4.

In step 36 the component CP supplies the first test parameter set P1 to the servo drive control device SRE and causes it to perform the same measurement scenario but on the basis of the second test parameter set P2 (second measurement). The second test parameter set P2 can for example consist of the determined compensation parameters P1*.

If necessary the component CP can also supply the setpoint values SW to the servo drive control device SRE or initiate and/or stop the performance of the measurement scenario by a simple signal to the servo drive control device SRE, for example as mentioned above by a Boolean signal.

The servo drive control device SRE, preferably the friction compensation module RKM of the servo drive control device SRE, generates a second test compensation signal K2 from the second test parameter set P2. The servo drive control device SRE then performs the measurement scenario, in which the second test parameter set P2 is used. In this case the servo drive control device SRE receives a second measurement signal MS1 from the machine tool WZM as feedback.

The servo drive control device SRE can then supply the second measurement signal MS1 to the component CP of the arithmetic unit RE.

In step S7 the arithmetic unit RE can calculate a second subsequent error signal from the second measurement signal MS2.

Figure 6:
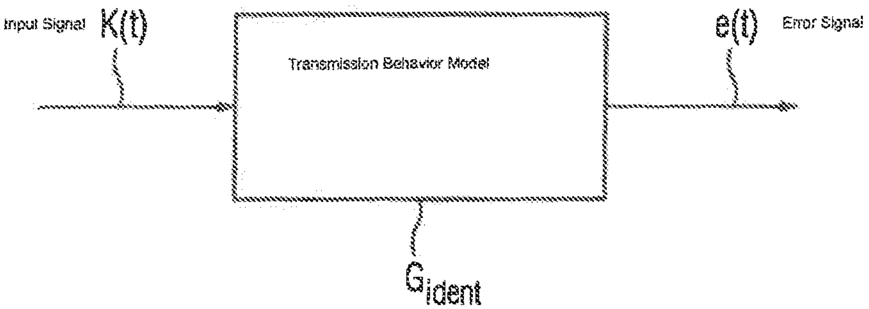
FIG. 6 shows a transmission behavior model.

Based on both the test compensation signals K1, K2 and both the error signals the component CP determines a transmission behavior model $G_{ident}$, wherein the transmission behavior model $G_{ident}$ describes a transmission behavior or a relationship between a compensation signal K(t) (as input signal) and an error signal e(t) (as output signal) (see FIG. 6).

The transmission behavior model $G_{ident}$ can for example be ascertained by a suitable identification procedure for dynamic systems.

In one form of embodiment a multiplicative relationship can exist between the transmission behavior model and the transmission function (considered above) of the self-contained position control loop.

For example, the transmission behavior model $G_{ident}$ can be calculated/ascertained as follows. Firstly a difference signal vKompDiff( ) is calculated between the first compensation signal K1 and the second compensation signal K2. Then follows a calculation of the difference signal eXDiff(t) between the first measurement signal MS1 and the second measurement signal MS2, which for example are designed as actual position signals, or a calculation of a difference between the first and the second error signal. The transmission behavior model $G_{ident}$ can then be determined, for example by means of a linear least-squares method for ARX model (Autogressive Model with exogenous input), wherein the compensation signal difference vKompDiff(t) is used as the input signal and the measurement signal difference or the error signal difference eXDiff(t) is used as the output signal. The numerator and denominator order to be specified for the ARX model can be defined by the adjustment parameters or algorithm parameters A.

Other methods for ascertaining the transmission behavior model $G_{ident}$ are also conceivable, which based on associated datasets or measurements of the time curve of the input and output signals of a dynamic system structure and parameters of a suitable mathematical model which describes the static and/or dynamic behavior of the examined system sufficiently accurately.

The transmission behavior model $G_{ident}$ can for example be designed as a time-discrete transmission function.

In step S8 the compensation parameters P2* are determined on the basis of the transmission behavior model $G_{ident}$.

In this case a minimization of a quality value can take place, which relates both to the first error signal, for example eX(t), as well as to a simulated error signal, wherein the simulated error signal is obtained by applying the transmission behavior model $G_{ident}$ to a (variable) compensation curve. The aim of varying the parameters defining the compensation curve is to make the simulated error signal coincide with the first error signal.

As already mentioned, the optimization is not restricted to the first error signal as the target. In general a quality value that relates to a specified error signal and to a simulated (error) signal can be optimized. In this case, in order to receive the simulated (error) signal, the transmission behavior model $G_{ident}$ can be applied to a (random) compensation curve. The simulated (error) signal thus forms the starting point for the optimization. The first or else the second error signal can be used as a specified error signal. The use of the first error signal may however produce better results.

In other words the compensation parameters P2* can be determined as follows on the basis of the transmission behavior model $G_{ident}$ (for example the component CP can perform this). Firstly a compensation curve is generated from random compensation parameters (starting values for the optimization). This compensation curve is then used as the input of the transmission behavior model $G_{ident}$, in order to generate the simulated error signal. In a further step a quality value relating to a difference between the simulated and the first error signal is minimized by varying the compensation parameters. To ascertain the quality value from the simulated and the first error signal a p-norm relating to a specified time window after the occurrence of the reversal point can for example be used. For example, a 4-norm of the difference between $G_{ident}(vK(t))$ and eX(t) can be minimized within a timeframe of 400 ms after the occurrence of a reversal point.

At this point it may be noted that the simulation $G_{ident}\{vK(t)\}$, which replaces the real measurement which comprises at least the duration between two reversal points (in the range of seconds, for example approx. 30 seconds) is concluded in a few milliseconds.

It is also conceivable for another p-norm to be used, where $p \in \mathbb{R}$, $p \geq 1$.

A separate consideration (the determination of the transmission behavior model $G_{ident}$ and the subsequent optimization) of both the reversal points in the time intervals T_UP1 and T_UP2 is advantageous.

The operation $G_{ident}(vK(t))$ for example describes the output variable calculated from the compensation signal vK(t) and the identified transmission behavior $G_{ident}$. $G_{ident}(vK(t))$ can for example be ascertained by a numeric simulation procedure. For the transmission function $G_{ident}$ a linear difference equation can be specified, from which Gident(vK(t)) can be ascertained directly. Initial states or unknown past values of the sequence vK(t) can be set as equal to zero.

An iterative nonlinear gradient-based procedure can for example be used as the optimization procedure for determining the compensation parameters P2*.

In this case the aforementioned parameter values P1* determined on the basis of just one measurement can be used as the initial values of the optimization.

The search direction can be ascertained in accordance with a quasi-Newton procedure.

The gradient of the quality value needed for the quasi-Newton procedure in respect of the optimization variables (of the compensation parameters) can be determined at each iteration point on the basis of an analytical calculation rule.

The step width of the iteration step can be ascertained with an iterative one-dimensional search procedure on the basis of the golden section.

The optimization method can take account of inequality restrictions in respect of the optimization variables.

Different criteria, including a limit value for the maximum number of iterations and a tolerance criterion for the quality value improvement, can be used as a termination condition for the optimization.

In step S9 the component CP can cause the servo drive control device SRE to perform the operating process a further time and in this case to use the compensation parameters P2* determined on the basis of the transmission behavior model $G_{ident}$. In this case the servo drive control device SRE generates the corresponding compensation signal and receives a third measurement signal MS3 as feedback.

In step S10 the component CP can, based on the third measurement signal MS3, determine a third error signal, and compare the first, the second and the third error signals, in order to select those compensation parameters that result in the most minor error signal.

Figure 7:
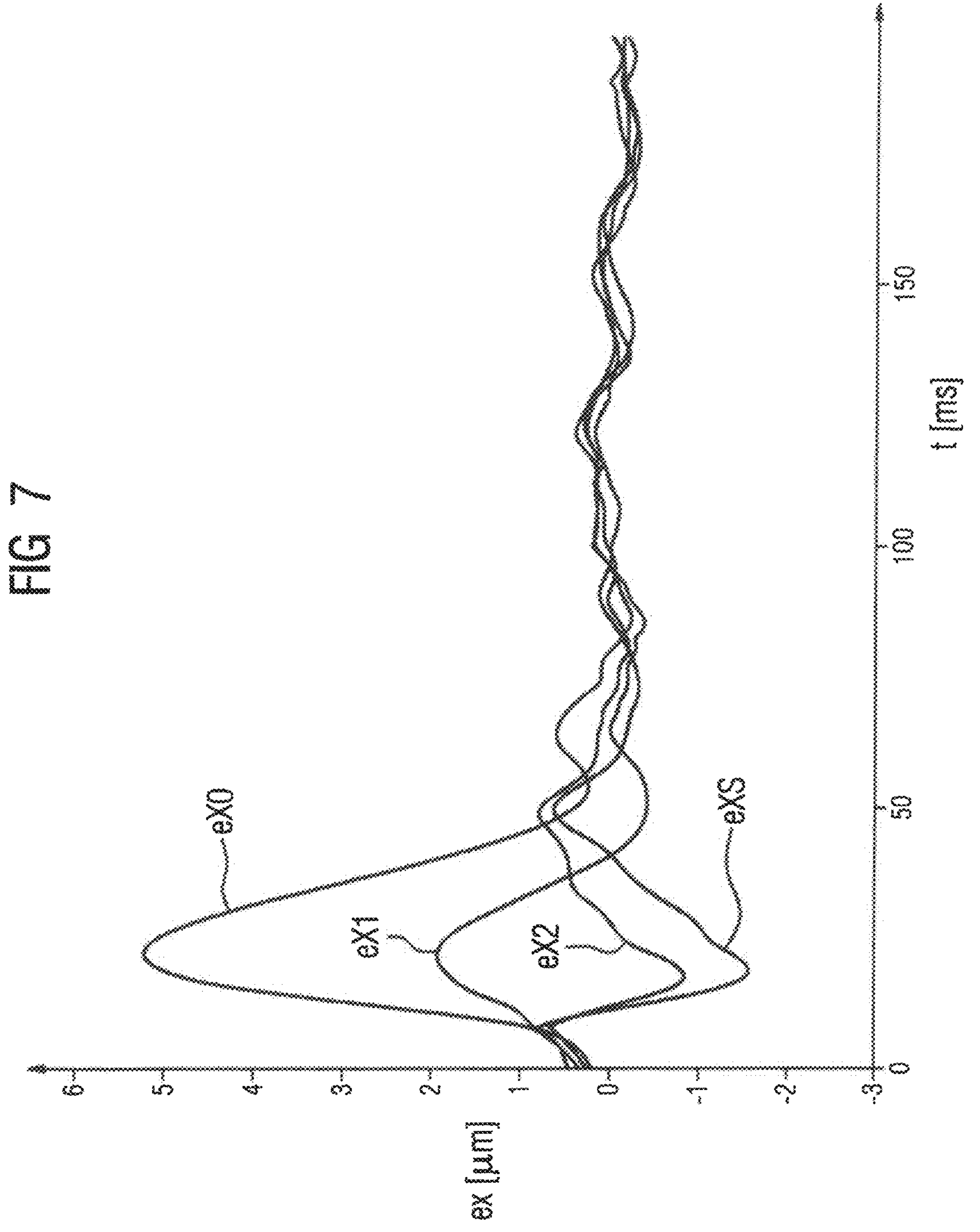
FIG. 7 shows a comparison of different compensation signals.

An example of a result in accordance with step 310 is illustrated in FIG. 7. In FIG. 7 different error signals eX0, eXS, eX1, eX2 for a translatory feed shaft are shown by way of example, wherein eX0 is the first error signal, which for example results from a compensation not present (compensation signal=0), eXS is an error signal with a compensation in accordance with the prior art, eX1 is the second error signal and eX2 is the third error signal, which, as described in step S10, has been corrected in respect of the second and the first error signal.

The characteristic of the compensation may further depend on the shaft position of the machine. It may therefore be expedient if the parameters P, the test parameters P1, P2 and the compensation parameters P1*, P2* are determined as a function of the shaft position of the machine, wherein the vector X characterizes the position of the machine shafts. For example, the parameters Amp, Tt, Th, Td of the corresponding parameter sets may depend on X. In particular, in the case of dependencies on the shaft position X, a fast automated determination of the shaft-position-dependent parameters is of great importance.

Figure 8:
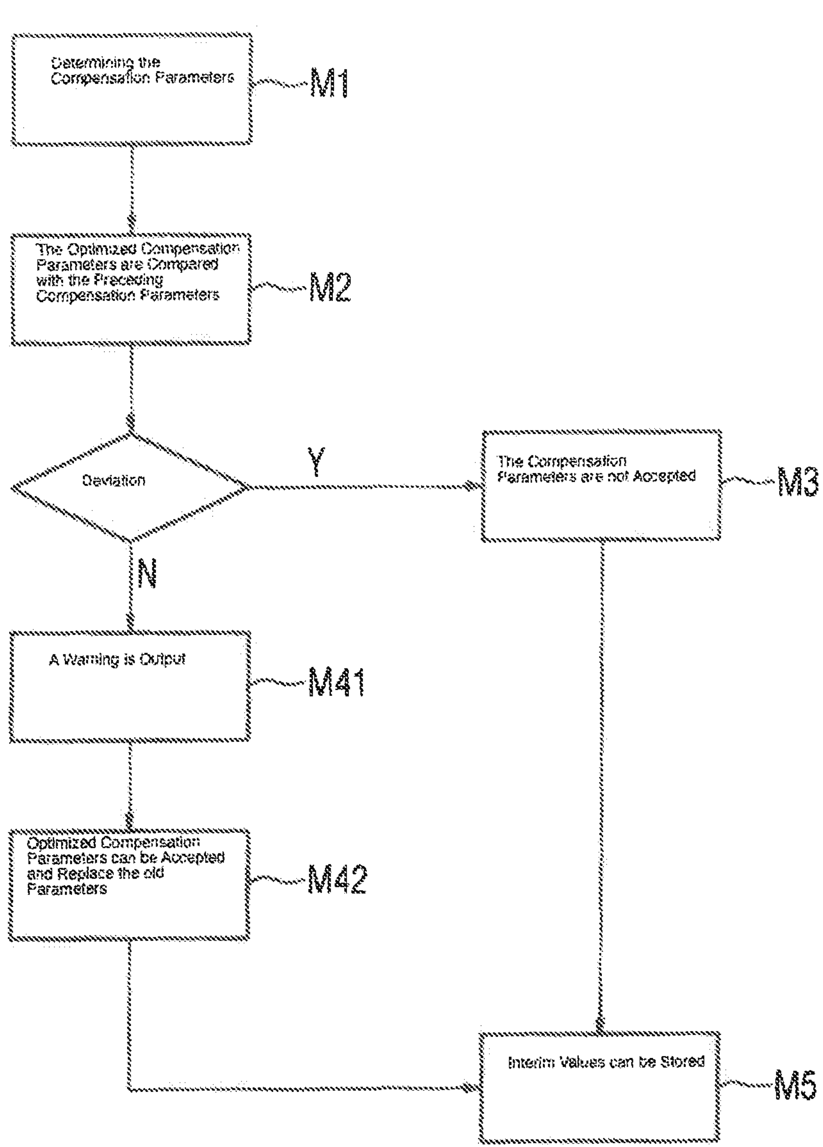
FIG. 8 shows an algorithm for status-dependent maintenance and/or adaptation to a changed system behavior.

FIG. 8 shows a flow diagram, which illustrates a method for status-dependent maintenance and/or for adaptation to modified system behavior. In this case a control target, for example the machine tool WZM, is monitored. The control target is controlled during operation by a servo drive control device, for example by the above-described servo drive control device SRE. The servo drive control device can for example control a position-controlled feed shaft of the machine tool (see above). The servo drive control device is designed, on occurrence of a disturbance in the control target, to generate a compensation signal on the basis of (preceding) compensation parameters, in order to compensate for the disturbance.

During the monitoring of the control target, for example of the machine shaft, the above-described method for determining the (optimized) compensation parameters P1*, P2* is executed in an event-triggered or event-controlled manner and/or at periodic time intervals—step M1.

Then—in step M2—the optimized compensation parameters P1* or P2* are compared with the (preceding) compensation parameters.

When a deviation exists between the compensation parameters exceeding a predefined value (for example a 10% overshoot or undershoot for Amp, Th, Tt, Td or of a quality value J) and the optimized compensation parameters P1* or P2* a corresponding warning is output—step M41.

This warning can then be checked by the operating personnel. The warning can also contain an option for acceptance. With or without this option the optimized compensation parameters P1* or P2* can be accepted and can replace the old parameters—step M42.

The optimized compensation parameters P1* or P2* can for example be stored by the component CP on the arithmetic unit RE or on the servo drive control device SRE or also somewhere else, for example in a cloud.

Once the optimized compensation parameters P1* or P2* have been accepted, the servo drive control device SRE can execute the compensation on the basis of said parameters.

As a result an adaptation to modified system behavior and/or friction conditions can take place.

The comparison of the compensation parameters can for example take place based on corresponding norm variables, for example on the aforementioned p-norm, and tolerance values.

The triggering of the method for determining the optimized compensation parameters P1*, P2* can for example take place in accordance with a defined quality criterion during a reference run (for example circular test) or during regular machine operation and parts processing (event-triggered actuation). A criterion such as this can for example be an increased setpoint actual value deviation at the shaft reversal points. It is also conceivable for the method to be performed at particular time intervals, for example weekly.

The method for determining the optimized compensation parameters P1*, P2* can likewise be used in wear-out analysis procedures, other maintenance procedures, and condition-monitoring procedures.

If the originally set compensation is still valid, i.e. the differences between the (preset) compensation parameters and the optimized compensation parameters are minor (in accordance with defined norm variables, for example p-norm, and tolerance values), the system can remain unchanged and the compensation parameters P1*, P2* are not accepted—step M3.

In step M5 interim values, compensation values, quality levels for example for trend identification and for further analysis, can be stored.

Although the invention has been illustrated and described in greater detail using exemplary embodiments, the invention is not restricted by the disclosed examples. Variations therefrom can be derived by the person skilled in the art, without departing from the scope of protection of the invention, as defined by the following claims. In particular, the features described in connection with the method can also be used by devices and apparatuses in the system shown or can supplement these and vice versa.

In summary, a method is proposed in this disclosure which in the context of a commissioning program (PC-based or HMI-based) permits a fast and, in line with the positioning quality, a good selection of the compensation parameters of the compensation described above, in particular friction compensation.

The invention claimed is:

1. A method for determining compensation parameters comprising:

providing a first test parameter set;

performing an operating process with a servo drive control device;

controlling a control target during the operating process by the servo drive control device, wherein at least one disturbance occurs during operation of the control target because of a friction effect occurring during operation at at least one reversal point of a servo-driven shaft of the control target;

generating a first test compensation signal during the performance of the operating process with the servo drive control device based on the first test parameter set;

receiving a first measurement signal as feedback;

determining a first error signal from the first measurement signal;

determining the compensation parameters by a substitution model mapping error signals to compensation signals with the substitution model using the first error signal, the compensation parameters defining a compensation signal;

generating, on occurrence of the at least one disturbance, the compensation signal based on the compensation parameters with the servo drive control device, in order to reduce a subsequent error that can be attributed to the disturbance; and providing the compensation signal to compensate for at least one disturbance.

2. The method of claim 1, wherein setpoint values are used during the determination of the first error signal, wherein the setpoint values are defined by the operating process.

3. The method of claim 1, wherein to determine the compensation parameters, a difference between a compensation curve and the first error signal mapped by the substitution model to a compensation signal is minimized, wherein the compensation curve is used as a minimization variable.

4. The method of claim 1, wherein the substitution model models a behavior of the servo drive control device and of the control target.

5. The method of claim 4, wherein the substitution model is designed as a model of a self-contained control loop, for example of a position control loop.

6. The method of claim 1, wherein the first test parameter set comprises compensation parameters which are all equal to zero and the operating process takes place without compensation.

7. The method of claim 1, further comprising:

providing a second test parameter set;

repeating the operating process with the servo drive control device;

generating a second test compensation signal during the repetition of the operating process with the servo drive control device based on the second test parameter set;

receiving a second measurement signal as feedback, wherein the second test compensation signal differs from the first test compensation signal;

determining a second error signal from the second measurement signal;

determining, based on the test compensation signals, as test input, and the error signals, as test output, a transmission behavior model;

mapping compensation signals to error signals with the transmission behavior model; and determining the compensation parameters based on the transmission behavior model.

8. The method of claim 7, wherein an optimization, in particular a minimization of a quality value relating to a specified error signal and to an error signal simulated by the transmission behavior model takes place during the determination of the compensation parameters on the basis of the transmission behavior model.

9. The method as claimed in claim 8, wherein the optimization, preferably the minimization, takes place by varying parameters, said parameters defining a compensation signal, said compensation signal being used as input for the transmission behavior model, in order to generate a simulated error signal.

10. The method of claim 9, wherein during the optimization, preferably during the minimization, the simulated error signal is made to coincide with the specified error signal.

11. The method of claim 8, wherein the specified error signal is the first error signal.

12. The method of claim 8, wherein the specified error signal is the second error signal.

13. The method of claim 8, wherein a p-norm where $p \in \mathbb{R}$, $p \geq 1$ is used as a quality value.

14. The method of claim 7, wherein the second test parameter set comprises the compensation parameters ascertained on the basis of the substitution model, and preferably consists of the compensation parameters ascertained on the basis of the substitution model.

15. The method of claim 7, further comprising:

performing the operating process a further time with the servo drive control device;

generating a compensation signal with the servo drive control device based on the compensation parameters determined based on the transmission behavior model;

receiving a third measurement signal as feedback;

determining a third error signal based on the third measurement signal; and comparing the first, the second and the third error signals in order to select those compensation parameters which result in a most minor error signal.

16. The method of claim 1, wherein the compensation parameters are determined as a function of the shaft position of the control target.

17. The method of claim 1, wherein the shaft is a feed shaft or rotational shaft.

18. The method of claim 1, wherein the at least one reversal point is a position reversal point.

19. The method of claim 1, the method further comprising:

monitoring the control target in an event-triggered manner and/or at periodic time intervals, in order to determine optimized compensation parameters;

comparing the optimized compensation parameters with the compensation parameters; and outputting a warning when a deviation exceeding a predefined value exists between the compensation parameters and the optimized compensation parameters.

20. The method of claim 19, wherein the method is a wear-out analysis method, a maintenance procedure, preferably a status-oriented maintenance procedure or a condition monitoring method.

21. The method of claim 19, wherein when the deviation exceeding the predefined value exists between the compensation parameters and the optimized compensation parameters, the optimized compensation parameters are accepted.

22. A system, comprising:

a servo drive control device;

a control target; and an arithmetic unit, wherein the arithmetic unit is configured to provide a first test parameter set;

perform an operating process with the servo drive control device;

control the control target during the operating process by the servo drive control device, wherein at least one disturbance occurs during operation of the control target because of a friction effect occurring during operation at at least one reversal point of a servo-driven shaft of the control target;

generate a first test compensation signal during the performance of the operating process with the servo drive control device based on the first test parameter set;

receive a first measurement signal as feedback;

determine a first error signal from the first measurement signal;

determine the compensation parameters by a substitution model mapping error signals to compensation signals with the substitution model using the first error signal, the compensation parameters defining a compensation signal;

generate, on occurrence of the at least one disturbance, the compensation signal based on the compensation parameters with the servo drive control device, in order to reduce a subsequent error that can be attributed to the disturbance; and provide the compensation signal to compensate for at least one disturbance.

23. The system of claim 22, wherein the arithmetic unit is further configured to monitor the control target in an event-triggered manner and/or at periodic time intervals, in order to determine optimized compensation parameters;

compare the optimized compensation parameters with the compensation parameters; and output a warning when a deviation exceeding a predefined value exists between the compensation parameters and the optimized compensation parameters.

24. The system of claim 22, wherein the servo drive control device includes the arithmetic unit.

25. The system of claim 23, wherein the servo drive control device includes the arithmetic unit.

26. A computer program product, stored on a non-transitory computer readable medium, comprising commands which cause a system comprising a servo drive control device, a control target, and an arithmetic unit to provide a first test parameter set;

perform an operating process with the servo drive control device;

control the control target during the operating process by the servo drive control device, wherein at least one disturbance occurs during operation of the control target because of a friction effect occurring during operation at at least one reversal point of a servo-driven shaft of the control target;

generate a first test compensation signal during the performance of the operating process with the servo drive control device based on the first test parameter set;

receive a first measurement signal as feedback;

determine a first error signal from the first measurement signal;

determine the compensation parameters by a substitution model mapping error signals to compensation signals with the substitution model using the first error signal, the compensation parameters defining a compensation signal;

generate, on occurrence of the at least one disturbance, the compensation signal based on the compensation parameters with the servo drive control device, in order to reduce a subsequent error that can be attributed to the disturbance; and provide the compensation signal to compensate for at least one disturbance.

27. The computer program product of claim 26, further comprising commands which cause the system comprising the servo drive control device, the control target, and the arithmetic unit to monitor the control target in an event-triggered manner and/or at periodic time intervals, in order to determine optimized compensation parameters;

compare the optimized compensation parameters with the compensation parameters; and output a warning when a deviation exceeding a predefined value exists between the compensation parameters and the optimized compensation parameters.

* * * * *